US012655282B2

(12) United States Patent
Okazaki et al.

(10) Patent No.: US 12,655,282 B2
(45) Date of Patent: Jun. 16, 2026

(54) ELASTOMER COMPOSITION, SEALING MATERIAL, AND METHOD FOR PRODUCING SEALING MATERIAL

(71) Applicant: VALQUA, LTD., Tokyo (JP)

(72) Inventors: Masanori Okazaki, Gojo (JP); Naoki Osumi, Gojo (JP); Masamune Noguchi, Gojo (JP)

(73) Assignee: VALQUA, LTD., Tokyo (JP)

( * ) Notice: Subject to any disclaimer, the term of this patent is extended or adjusted under 35 U.S.C. 154(b) by 539 days.

(21) Appl. No.: 18/246,688

(22) PCT Filed: Sep. 9, 2021

(86) PCT No.: PCT/JP2021/033159
§ 371 (c)(1),
(2) Date: Mar. 27, 2023

(87) PCT Pub. No.: WO2022/065056
PCT Pub. Date: Mar. 31, 2022

(65) Prior Publication Data
US 2023/0365799 A1 Nov. 16, 2023

(30) Foreign Application Priority Data
Sep. 28, 2020 (JP) ................................ 2020-162302

(51) Int. Cl.
*C08L 27/12* (2006.01)
*C08K 5/5425* (2006.01)
*C09K 3/10* (2006.01)
*F16J 15/10* (2006.01)

(52) U.S. Cl.
CPC ............ *C08L 27/12* (2013.01); *C08K 5/5425* (2013.01); *C09K 3/1009* (2013.01); *F16J 15/10* (2013.01); *C08L 2205/025* (2013.01); *C08L 2312/00* (2013.01); *C09K 2200/0637* (2013.01)

(58) Field of Classification Search
CPC ............... C08L 27/12; C08L 2205/025; C08L 2312/00; C08L 2205/03; C08L 2205/035; C08L 27/16; C08L 83/04; C08L 71/02; C08K 5/5425; C08K 5/14; C08K 5/34924; C08K 5/0025; C09K 3/1009; C09K 2200/0637; C09K 3/10; F16J 15/10; F16J 15/102; C08G 77/20; C08J 2327/16; C08J 3/244; C08J 3/24; C08J 3/28
See application file for complete search history.

(56) References Cited

U.S. PATENT DOCUMENTS 6,040,400 A 3/2000 Fukuda et al.
6,787,610 B2 9/2004 Morimoto et al.
6,790,533 B2 9/2004 Reitmeier et al.
7,678,858 B2 3/2010 Tanaka et al.
8,716,419 B2 5/2014 Kose et al.
9,458,314 B2 10/2016 Usami
10,138,352 B2 11/2018 Sumino et al.
11,117,993 B2 9/2021 Hattori et al.
11,732,073 B2 8/2023 Hattori et al.
2002/0187358 A1 12/2002 Reitmeier et al.
2003/0114599 A1 6/2003 Morimoto et al.
2005/0165168 A1* 7/2005 Park ........................ C08L 67/02
525/178
2006/0235140 A1 10/2006 Tanaka et al.
2008/0153986 A1 6/2008 Maeda et al.
2011/0015342 A1 1/2011 Kose et al.
2012/0172513 A1* 7/2012 Fujimoto ................. C08K 5/14
524/432
2015/0024216 A1 1/2015 Usami
2017/0283585 A1 10/2017 Sumino et al.
2018/0208742 A1 7/2018 Yamada et al.
2019/0055382 A1 2/2019 Kitaichi et al.
2020/0102411 A1 4/2020 Hattori et al.
2020/0109227 A1 4/2020 Hattori et al.
2020/0277467 A1* 9/2020 Yasuda ................... C08L 27/12

FOREIGN PATENT DOCUMENTS

| | | | |
|---|---|---|---|
| CN | 101080463 | A | 11/2007 |
| CN | 101981067 | A | 2/2011 |
| CN | 108137893 | A | 6/2018 |
| CN | 110799554 | A | 2/2020 |
| CN | 110809588 | A | 2/2020 |
| EP | 2258733 | A1 | 12/2010 |
| EP | 2258733 | B1 | 4/2013 |
| EP | 2264100 | B1 | 1/2017 |
| EP | 3366721 | A1 | 8/2018 |
| EP | 3647332 | A1 | 5/2020 |
| EP | 3650476 | A1 | 5/2020 |
| EP | 2264100 | A1 | 12/2020 |
| EP | 3988297 | A1 | 4/2022 |
| JP | H11116684 | A | 4/1999 |
| JP | H11116685 | A | 4/1999 |
| JP | 2002097329 | A | 4/2002 |
| JP | 2003096303 | A | 4/2003 |
| JP | 2003183402 | A | 7/2003 |
| JP | 2005113035 | A | 4/2005 |
| JP | 2006342241 | A | 12/2006 |
| JP | 2008056739 | A | 3/2008 |
| JP | 4720501 | B2 | 7/2011 |
| JP | 2013057057 | A | 3/2013 |
| JP | 2013166859 | A | 8/2013 |
| JP | 2014114383 | A | 6/2014 |
| JP | 2014118536 | A | 6/2014 |

(Continued)

*Primary Examiner* — Alicia Bland
(74) *Attorney, Agent, or Firm* — The Webb Law Firm

(57) ABSTRACT

One embodiment of the present invention relates to an elastomer composition, a sealing material, or a method for producing a sealing material, in which the elastomer composition includes a crosslinkable fluoroelastomer (A) other than a perfluoroelastomer, an ethylenically unsaturated bond-containing compound (B), a crosslinking agent (C), and a crosslinking aid (D), the ethylenically unsaturated bond-containing compound (B) contains at least one selected from compounds having a perfluoro skeleton having an ethylenically unsaturated bond and compounds having a siloxane skeleton having an ethylenically unsaturated bond, and a mass ratio of a content of the crosslinking aid (D) to the crosslinking agent (C) is 5 or more.

7 Claims, No Drawings

(56) References Cited

FOREIGN PATENT DOCUMENTS

| | | | |
|---|---|---|---|
| JP | 2015067737 | A | 4/2015 |
| JP | 2015127358 | A | 7/2015 |
| JP | 2017149839 | A | 8/2017 |
| JP | 2019026723 | A | 2/2019 |
| JP | 2019052226 | A | 4/2019 |
| JP | 2019065307 | A | 4/2019 |
| JP | 2019214743 | A | 12/2019 |
| JP | 2020203444 | A | 12/2020 |
| WO | 2004094527 | A | 11/2004 |
| WO | 2006068099 | A | 6/2006 |
| WO | 2009119409 | A | 10/2009 |
| WO | 2016043100 | A | 3/2016 |
| WO | 2017145920 | A | 8/2017 |
| WO | 2019054293 | A | 3/2019 |

* cited by examiner

ELASTOMER COMPOSITION, SEALING MATERIAL, AND METHOD FOR PRODUCING SEALING MATERIAL

CROSS-REFERENCE TO RELATED APPLICATIONS

This application is the United States national phase of International Application No. PCT/JP2021/033159 filed Sep. 9, 2021, and claims priority to Japanese Patent Application No. 2020-162302 filed Sep. 28, 2020, the disclosures of which are hereby incorporated by reference in their entireties.

BACKGROUND OF THE INVENTION

Field of the Invention

One embodiment of the present invention relates to an elastomer composition, a sealing material, or a method for producing a sealing material.

Description of Related Art

Conventionally, a sealing material has been widely used in various applications, and among these applications, a sealing material used in, for example, a semiconductor manufacturing apparatus is exemplified as an application of the sealing material applying the most load to the sealing material.

For such a sealing material, a crosslinkable fluoroelastomer such as a fluoroelastomer (FKM) or a perfluoroelastomer (FFKM) is used because a sealing material excellent in plasma resistance and radical resistance can be obtained.

For example, Patent Literature 1: JP 2019-52226 A discloses an uncrosslinked rubber composition including a hydrogen-containing fluororubber, a hydrogen site protecting agent, and a thermal crosslinking agent.

SUMMARY OF THE INVENTION

Technical Problem

However, as a sealing material formed from a conventional elastomer composition as described in Patent Literature 1 above, in particular, a sealing material to be used in such applications where generation of particles, for example, in a plasma atmosphere is a problem, a sealing material to which no filler is added or to which a small amount of filler is added is used, but there is room for improvement in these sealing materials in terms of tensile stress at 100% elongation (100% Mo).

One embodiment of the present invention provides an elastomer composition capable of forming a sealing material having high tensile stress at 100% elongation (100% Mo).

Solution to Problem

As a result of intensive studies to solve the above problems, the present inventor has found that the above problems can be solved according to the following example configuration, and has completed the present invention.

An example configuration of the present invention is as follows.

[1] An elastomer composition including:

a crosslinkable fluoroelastomer (A) other than a perfluoroelastomer, an ethylenically unsaturated bond-containing compound (B), a crosslinking agent (C), and a crosslinking aid (D), in which the ethylenically unsaturated bond-containing compound (B) contains at least one selected from compounds having a perfluoro skeleton having an ethylenically unsaturated bond and compounds having a siloxane skeleton having an ethylenically unsaturated bond, and a mass ratio of a content of the crosslinking aid (D) to the crosslinking agent (C) is 5 or more.

[2] The elastomer composition according to [1], in which the elastomer (A) is a peroxide-crosslinkable fluoroelastomer.

[3] The elastomer composition according to [1] or [2], in which a content of the ethylenically unsaturated bond-containing compound (B) is 0.5 to 50 parts by mass based on 100 parts by mass of a content of the elastomer (A).

[4] The elastomer composition according to any one of [1] to [3], in which a content of the crosslinking aid (D) is 1 to 10 parts by mass based on 100 parts by mass of a content of the elastomer (A).

[5] The elastomer composition according to any one of [1] to [4], in which a content of a filler is 5 parts by mass or less based on 100 parts by mass of the elastomer (A).

[6] A sealing material that is a radiation-crosslinked body of the elastomer composition according to any one of [1] to [5].

[7] A method for producing a sealing material, including a step of irradiating the elastomer composition according to any one of [1] to [5] or a crosslinked product of the elastomer composition with radiation.

Advantageous Effects of Invention

According to one embodiment of the present invention, a sealing material having high 100% Mo can be formed, and in particular, a sealing material excellent in hardness, tensile strength, and 100% Mo in a well-balanced manner can be obtained. Moreover, according to one embodiment of the present invention, it is possible to obtain a sealing material excellent in, for example, plasma resistance (radical resistance), crack resistance, and compression set. Thus, the sealing material can be suitably used as a sealing material for a semiconductor manufacturing apparatus and a sealing material for a plasma processing apparatus.

DESCRIPTION OF THE INVENTION

<<Elastomer Composition>>

The elastomer composition according to one embodiment of the present invention (hereinafter, also referred to as the "present composition") includes a crosslinkable fluoroelastomer (A) other than a perfluoroelastomer, an ethylenically unsaturated bond-containing compound (B), a crosslinking agent (C), and a crosslinking aid (D), the ethylenically unsaturated bond-containing compound (B) contains at least one selected from compounds having a perfluoro skeleton having an ethylenically unsaturated bond and compounds having a siloxane skeleton having an ethylenically unsaturated bond, and the mass ratio of the content of the crosslinking aid (D) to the crosslinking agent (C) is 5 or more.

<Elastomer (A)>

The elastomer (A) is not particularly limited as long as it is a crosslinkable fluoroelastomer other than a perfluoroelastomer, and is also referred to as unvulcanized fluororubber, and examples of the crosslinking type include a peroxide crosslinking type, a polyol crosslinking type, an amine crosslinking type, and a radiation crosslinking type. Among them, the fluoroelastomer is preferably a peroxide-crosslinkable fluoroelastomer from the viewpoint that, for example, it is not necessary to use an acid acceptor that may be a generation source of particles, for example, in a plasma atmosphere, and thus there is no risk of generating particles during use of the obtained sealing material.

The elastomer (A) contained in the present composition may be one kind or two or more kinds.

In the present invention, “elastomer” and “rubber” have the same meaning, and are not particularly distinguished from each other.

Specific examples of the elastomer (A) include a fluoroelastomer (FKM), a tetrafluoroethylene-propylene elastomer (FEPM), and a fluorine thermoplastic elastomer (for example, an elastomer containing at least one elastomeric polymer chain segment and at least one non-elastomeric polymer chain segment, at least one of which is a fluorine-containing polymer chain segment).

As the elastomer (A), an elastomer capable of providing a sealing material exhibiting resistance to plasma (plasma etching treatment) used in various semiconductor dry processes is preferable, and FKM is more preferable because of relatively good plasma resistance and excellent sealability. In addition, FKM is also preferable from the viewpoints of, for example, being inexpensive and versatile.

As the elastomer (A), one synthesized by a conventionally known method may be used, or a commercially available product may be used. Examples of the commercially available product include “DAI-EL” manufactured by DAIKIN INDUSTRIES, LTD., “VITON” manufactured by The Chemours Company, “Dyneon” manufactured by 3M Company, and “Tecnoflon” manufactured by Solvay.

The fluorine content of the elastomer (A) is preferably 55% by mass or more, more preferably 60% by mass or more, still more preferably 63% by mass or more, and preferably 73% by mass or less, more preferably 72% by mass or less, still more preferably 71% by mass or less.

By using the elastomer (A) having a fluorine content in the above range, it is possible to easily obtain a sealing material having high 100% Mo, particularly being excellent in hardness, tensile strength, and 100% Mo in a well-balanced manner.

The fluorine content can be measured and calculated by, for example, elemental analysis of fluorine using, for example, $^{19}$F-NMR, or $^{1}$H-NMR or mass spectrometry (MS spectrum method).

The fluorine content in the present invention is a value obtained by rounding to the nearest Integer.

As one aspect of the elastomer (A), it is preferable to use the elastomer (A1) having a fluorine content in a range of 69 to 73% by mass and the elastomer (A2) having a fluorine content in a range of 55 to 68% by mass.

As long as each fluorine content of the elastomer (A1) and the elastomer (A2) is in the above range, the kinds of constituent units constituting these elastomers may be the same or different.

When the present composition contains the elastomer (A1), the elastomer (A1) contained in the present composition may be one kind or two or more kinds. When the present composition contains the elastomer (A2), the elastomer (A2) contained in the present composition may be one kind or two or more kinds.

The fluorine content of the elastomer (A1) is 69% by mass or more, preferably 70% by mass or more, and 73% by mass or less, preferably 71% by mass or less.

The fluorine content of the elastomer (A2) is 55 to 68% by mass, preferably 60 to 68% by mass, more preferably 63 to 68% by mass, and still more preferably 65 to 68% by mass.

By using the elastomers (A1) and (A2), it is possible to easily obtain a sealing material having high 100% Mo, particularly being excellent in hardness, tensile strength, and 100% Mo in a well-balanced manner. In addition, a uniform elastomer composition can be easily obtained in a short time, and an elastomer composition excellent in moldability, particularly, sheeting property can be easily obtained.

The Mooney viscosity of the elastomer (A) is preferably 10 or more, more preferably 15 or more, still more preferably 20 or more, and preferably 140 or less, more preferably 120 or less, still more preferably 80 or less, particularly preferably 60 or less.

When the Mooney viscosity of the elastomer (A) is in the above range, an elastomer composition excellent in moldability, particularly, sheeting property can be easily obtained.

In the present specification, the Mooney viscosity refers to a Mooney viscosity (ML 1+10) at 121° C. measured in accordance with ASTM D 1646.

The content of the elastomer (A) in the solid content of the present composition is preferably 50% by mass or more, more preferably 70% by mass or more, and preferably 97% by mass or less, more preferably 95% by mass or less.

When the content of the elastomer (A) is in the above range, a sealing material excellent in sealability and plasma resistance can be easily obtained.

In the present specification, the solid content refers to a component other than a solvent.

The content of the elastomer (A1) is preferably 60% by mass or more, more preferably 65% by mass or more, and preferably 95% by mass or less, more preferably 90% by mass or less based on the total content of the elastomers (A1) and (A2) in the present composition.

When the mass ratio of the contents of the elastomers (A1) and (A2) is in the above range, a uniform elastomer composition can be made in a short time, an elastomer composition excellent in moldability, particularly, sheeting property can be easily obtained, and a sealing material having high 100% Mo, particularly being excellent in hardness, tensile strength, and 100% Mo in a well-balanced manner can be easily obtained.

[FKM]

The FKM is not particularly limited, but examples thereof include polymers containing a hydrogen atom (carbon-hydrogen bond) in the polymer main chain, and specifically, it is preferable to contain a constituent unit derived from vinylidene fluoride.

The FKM is not particularly limited, but specific examples thereof include a vinylidene fluoride-hexafluoropropylene polymer; a vinylidene fluoride-hexafluoropropylene-tetrafluoroethylene polymer; a vinylidene fluoride-propylene-tetrafluoroethylene polymer; an ethylene-tetrafluoroethylene-perfluoroalkyl vinyl ether polymer; and a vinylidene fluoride-tetrafluoroethylene-perfluoroalkyl vinyl ether polymer.

Preferred example of the perfluoroalkyl vinyl ether is perfluoromethyl vinyl ether.

Among them, a ternary polymer is preferable, and a vinylidene fluoride-hexafluoropropylene-tetrafluoroethylene polymer is more preferable from the viewpoint of, for example, being excellent in, for example, plasma resistance, heat resistance, and resistance to chemicals.

The peroxide-crosslinkable fluoroelastomer preferably has a functional group such as an iodine group, a bromine group, a cyano group, a peroxy group, or an unsaturated group, and more preferably has an iodine group or a bromine group from the viewpoint of ease of introduction of the functional group.

The fluoroelastomer having an iodine group and/or a bromine group can be obtained, for example, by using one or more kinds of saturated or unsaturated iodine-containing and/or bromine-containing compound(s) at the time of synthesis of the elastomer.

Examples of the iodine-containing and/or bromine-containing compound include compounds represented by the following formula (1) or (2).

By using the compound represented by the following formula (1), a fluoroelastomer having an iodine group and/or a bromine group in a side chain can be synthesized, and by using the compound represented by the following formula (2), a fluoroelastomer having an iodine group and/or a bromine group at a terminal can be synthesized.

$$CY^1_2{=}CY^2RfX \quad (1)$$

wherein $Y^1$ and $Y^2$ are each independently a fluorine atom, a hydrogen atom, or a methyl group, Rf is a linear or branched fluorine-containing alkylene group in which some or all of the hydrogen atoms are substituted with a fluorine atom, or a group containing an ether bond in a part of the fluorine-containing alkylene group, and X is an iodine atom or a bromine atom.

Specific examples of the compound represented by the formula (1) include the compounds described in WO 2009/119409 A.

$$I_nBr_mR \quad (2)$$

wherein R is a fluorohydrocarbon group having 1 to 12 carbon atoms, subscripts n and m are each independently an integer of 0 to 2, and n+m is 1 or 2.

Specific examples of the compound represented by the formula (2) include compounds described in JP 2002-97329 A and JP 2008-56739 A.

<Ethylenically Unsaturated Bond-Containing Compound (B)>

Since the ethylenically unsaturated bond-containing compound (B) is used in the present composition, a non-adhesive sealing material having excellent plasma resistance can be easily obtained.

The compound (B) is at least one compound selected from compounds (B1) having a perfluoro skeleton having an ethylenically unsaturated bond and compounds (B2) having a siloxane skeleton having an ethylenically unsaturated bond. Of these, the compound (B) preferably contains the compound (B1) from the viewpoint of, for example, being capable of easily obtaining a sealing material having more excellent plasma resistance.

Examples of the ethylenically unsaturated bond include alkenyl groups having 2 to 8 carbon atoms such as a vinyl group, a methylvinyl group, an allyl group, a propenyl group, an isopropenyl group, a butenyl group, a pentenyl group, a hexenyl group, and a heptenyl group, a vinylphenyl group, a (meth)acryloyl group, an allyloxy group, a styryl group, and a propargyl group. Among them, the ethylenically unsaturated bond is preferably an alkenyl group, more preferably an alkenyl group having 2 to 4 carbon atoms, and particularly preferably a vinyl group.

The compound (B) may have two or more kinds of ethylenically unsaturated bonds.

As the compound (B), a compound synthesized by a conventionally known method may be used, or a commercially available product may be used. The commercially available product is, for example, "SIFEL" (manufactured by Shin-Etsu Chemical Co., Ltd.).

Examples of the commercially available product containing the compound (B) include commercially available products of one-component type and commercially available products of two-component type, and any of these may be used. Examples of the commercially available product containing the compound (B) include products in a liquid form, a paste form, an oil form, and a millable form, but any of these may be used.

When a commercially available product is used as the compound (B), the commercially available product may contain additives such as a reactive organosilicon compound having two or more hydrosilyl groups in the molecule (for example, an organosilicon compound described in, for example, JP 2003-183402 A or JP H11-116684 A), a catalyst (for example, a catalyst described in, for example, JP 2003-183402 A or JP H11-116684 A), and a filler (for example, silica), and as the compound (B), one containing these additives may be used.

The content of the compound (B) in the present composition is preferably 0.5 parts by mass or more, more preferably 1 part by mass or more, and preferably 50 parts by mass or less, more preferably 25 parts by mass or less, still more preferably 20 parts by mass or less, particularly preferably 10 parts by mass or less based on 100 parts by mass of the elastomer (A) from the viewpoints that, for example, a uniform elastomer composition can be made in a shorter time, and a sealing material having more excellent plasma resistance can be easily obtained.

The mass ratio of the content of the compound (B) to the content of the crosslinking agent (C) in the present composition (the content of the compound (B)/the content of the crosslinking agent (C)) is preferably 1 or more, more preferably 2 or more, and preferably 20 or less, more preferably 10 or less, from the viewpoint that, for example, a sealing material having more excellent plasma resistance can be easily obtained.

[Compound (B1)]

The compound (B1) is a compound other than the elastomer (A).

Examples of the compound (B1) include compounds having a perfluoropolyether structure having an ethylenically unsaturated bond and compounds having a perfluoroalkylene structure having an ethylenically unsaturated bond, and among these compounds, compounds having a perfluoropolyether structure having an ethylenically unsaturated bond (hereinafter, also referred to as "compounds (B1-1)") are preferable.

When the present composition contains the compound (B1), the compound (B1) contained in the present composition may be one kind or two or more kinds.

Compound (B1-1)

The compound (B1-1) is preferably a perfluoropolyether having two or more ethylenically unsaturated bonds in one molecule.

Preferred examples of the compound (B1-1) include compounds described in JP 2003-183402 A, JP H11-116684 A, JP H11-116685 A, and JP 2015-67737 A.

Examples of the compound (B1-1) include compounds represented by the following formula (1).

$$Z^1—(X)_p—(Rf\text{-}Q)_a\text{-}Rf—(X)_p—Z^2 \quad (1)$$

X is independently $—CH_2—$, $—CH_2O—$, $—CH_2OCH_2—$, $*—Si(R^2)_2\text{-Ph-}$ (wherein Ph: phenylene group), $*—Y—NR^1SO_2—$ or $*—Y—NR^1—CO—$ (wherein Y is $—CH_2—$ or $*—Si(R^2)_2\text{-Ph-}$, and the * moiety is bonded to $Z^1$ or $Z^2$).

Rf is a divalent perfluoropolyether group (divalent perfluorooxyalkylene group).

The subscript p is independently 0 or 1. The subscript a is an integer of 0 or more, preferably an integer of 0 to 10, and more preferably an integer of 0 to 6.

Q is a group represented by the following formula (2), (3), or (4).

$R^2$ is a substituted or unsubstituted monovalent hydrocarbon group having 1 to 10 carbon atoms, particularly 1 to 8 carbon atoms, and examples thereof include alkyl groups such as a methyl group, an ethyl group, a propyl group, an isopropyl group, a butyl group, an isobutyl group, a t-butyl group, a pentyl group, a hexyl group, an octyl group, and a decyl group; cycloalkyl groups such as a cyclopentyl group, a cyclohexyl group, and a cycloheptyl group; alkenyl groups such as a vinyl group, an allyl group, a propenyl group, an isopropenyl group, a butenyl group, and a hexenyl group; aryl groups such as a phenyl group, a tolyl group, a xylyl group, and a naphthyl group; aralkyl groups such as a benzyl group, a phenylethyl group, and a phenylpropyl group; and substituted forms of these groups in which some or all of the hydrogen atoms are substituted with, for example, a halogen atom (for example, a chloromethyl group, chloropropyl group, a bromoethyl group, and fluorine-substituted alkyl groups such as a 3,3,3-trifluoropropyl group and a 6,6,6,5,5,4,4,3,3-nonafluorohexyl group).

$R^1$ is a hydrogen atom or a substituted or unsubstituted monovalent hydrocarbon group having 1 to 10 carbon atoms, particularly 1 to 8 carbon atoms which is the same as the group exemplified for $R^2$, and examples of $R^1$ include a hydrogen atom and groups which are the same as groups for $R^2$, and specifically include alkyl groups such as a methyl group, an ethyl group, a propyl group, and an isopropyl group; cycloalkyl groups such as a cyclohexyl group; alkenyl groups such as a vinyl group and an allyl group, aryl groups such as a phenyl group and a tolyl group; and substituted forms of these groups in which some of the hydrogen atoms are substituted with, for example, a halogen atom (for example, a chloromethyl group, a chloropropyl group, and fluorine-substituted alkyl groups such as a 3,3,3-trifluoropropyl group and a 6,6,6,5,5,4,4,3,3-nonafluorohexyl group).

$Z^1$ and $Z^2$ are each independently an ethylenically unsaturated bond-containing group, and may be —Si(ethylenically unsaturated bond-containing group) $(R')_2$.

The ethylenically unsaturated bond-containing group is preferably a monovalent alkenyl group, more preferably a monovalent alkenyl group having 2 to 4 carbon atoms, and particularly preferably a monovalent vinyl group.

R' is independently a substituted or unsubstituted monovalent hydrocarbon group, and specific examples thereof include alkyl groups such as a methyl group, an ethyl group, a n-propyl group, an i-propyl group, a n-butyl group, an i-butyl group, a t-butyl group, a pentyl group, and a hexyl group; aryl groups such as a phenyl group, a tolyl group, and a xylyl group; and halogenated alkyl groups such as a 3-chloropropyl group and a 3,3,3-trifluoropropyl group. Among these, an alkyl group having 1 to 5 carbon atoms is preferable.

[Chemical Formula 1]

(2)

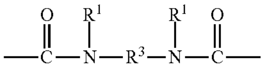

(3)

$$—(X)_p—CH_2CH_2R^4CH_2CH_2—(X)_p—$$

(4)

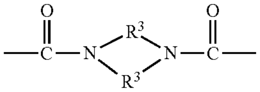

In Formulae (2) to (4), X, p and $R^1$ are as defined for X, p and $R^1$ in the formula (1). $R^3$ and $R^4$ are each independently a substituted or unsubstituted divalent hydrocarbon group in which one or more atoms selected from an oxygen atom, a nitrogen atom, a silicon atom, and a sulfur atom may be interposed between the bonding, and $R^3$ in Formula (2) and $R^4$ in Formula (3) may each independently be a group represented by the following formula (5) or (6).

[Chemical Formula 2]

(5)

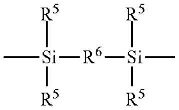

(6)

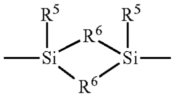

In Formulae (5) and (6), $R^5$ is a substituted or unsubstituted monovalent hydrocarbon group, and $R^6$ is a group containing one or more atoms selected from a carbon atom, an oxygen atom, a nitrogen atom, a silicon atom, and a sulfur atom.

$R^3$ and $R^4$ are not particularly limited as long as they are substituted or unsubstituted divalent hydrocarbon groups, but divalent hydrocarbon groups having 1 to 20 carbon atoms, particularly 2 to 12 carbon atoms are suitable, and specific examples thereof include alkylene groups such as a methylene group, an ethylene group, a propylene group, a methylethylene group, a butylene group, and a hexamethylene group; cycloalkylene groups such as a cyclohexylene group; arylene groups such as a phenylene group, a tolylene group, a xylylene group, a naphthylene group, and a biphenylene group; substituted forms of these groups in which some of the hydrogen atoms are substituted with, for example, a halogen atom; and combinations of these substituted or unsubstituted alkylene groups and/or arylene groups.

Preferably, $—(X)_p—(Rf\text{-}Q)_a\text{-}Rf—(X)_p—$ is $—(O—R^7)_n—$ [wherein $R^7$ represents a perfluoroalkanediyl group, subscript n represents an integer of 2 or more, and plural $R^7$ groups may be the same or different from each other].

Examples of the perfluoroalkanediyl group represented by $R^7$ include groups represented by $C_mF_{2m}$ (wherein subscript m is an integer of 2 or more), and the perfluoroalkanediyl group may be linear or branched. The number of carbon atoms of the perfluoroalkanediyl group (that is, subscript m) is, for example, 1 to 10, preferably 2 to 6, more preferably 2 to 4, and particularly preferably 2 to 3.

The subscript n may be 2 or more, and is, for example, 10 or more, preferably 40 or more, and more preferably 70 or more. Also, subscript n is, for example, 300 or less, preferably 200 or less, and more preferably 150 or less.

Also, $—(O—R^7)_n—$ may be a group which is the same as the following Rf.

The compound represented by the formula (1) is preferably a compound represented by the following formula (1-1).

$$CH_2{=}CH—(X)_p—(Rf\text{-}Q)_a\text{-}Rf—(X)_p—CH{=}CH_2 \quad (1\text{-}1)$$

[The definition of each symbol in Formula (1-1) is the same as the definition of each symbol in Formula (1).]

The compound represented by the formula (1-1) is preferably a compound in which subscript a is 0, and in this case, the compound is represented by the following formula (1-1-1).

$$CH_2{=}CH—(X)_p—Rf—(X)_p—CH{=}CH_2 (1\text{-}1\text{-}1)$$

[The definition of each symbol in Formula (1-1-1) is the same as the definition of each symbol in Formula (1).]

Specific examples of the Rf include the following groups.

$$[CF(Z)OCF_2]_p—(CF_2)_r—[CF_2OCF(Z)]_q—$$

(wherein Z is a fluorine atom or $—CF_3$, and subscripts p, q, and r are integers satisfying $p\geq1$, $q\geq1$, $2\leq p+q\geq200$, preferably $2\leq p+q\leq110$, and $0\leq r\leq6$), $$—CF_2CF_2OCF_2—(CF(CF_3)OCF_2)_s—(CF_2)_r—(CF_2OCF(CF_3))_t—CF_2OCF_2CF_2—$$

(wherein subscripts r, s, and t are integers satisfying $0\leq r\leq6$, $s\geq0$, $t\geq0$, $0\leq s+t\leq200$, and preferably $2\leq s+t\leq110$), $$—CF(Z)—(OCF(Z)CF_2)_u—(OCF_2)_v—OCF(Z)—$$

(wherein Z is a fluorine atom or $—CF_3$, and subscripts u and v are integers satisfying $1\leq u\leq100$ and $1\leq v\leq50$), $$—CF_2CF_2—[OCF_2CF_2CF_2]_w—OCF_2CF_2—$$

(wherein subscript w is an integer satisfying $1\leq w\leq100$)

[Compound (B2)]

The compound (B2) is preferably a polysiloxane having two or more ethylenically unsaturated bonds in one molecule, and is preferably an organopolysiloxane having two or more ethylenically unsaturated bonds in one molecule and having an organic group bonded to its silicon atom. The bonding site of the ethylenically unsaturated bond is not particularly limited.

When the present composition contains the compound (B2), the compound (B2) contained in the present composition may be one kind or two or more kinds.

Examples of the organic group bonded to the silicon atom include the ethylenically unsaturated bond, a linear alkyl group, a branched alkyl group, a cyclic alkyl group, an aryl group, an aralkyl group, and a halogenated alkyl group.

Examples of the linear alkyl group include groups having 1 to 20 carbon atoms, preferably 1 to 6 carbon atoms, such as a methyl group, an ethyl group, a propyl group, a hexyl group, an octyl group, and a decyl group.

Examples of the branched alkyl group include groups having 1 to 20 carbon atoms, preferably 1 to 6 carbon atoms, such as an isopropyl group, an isobutyl group, a t-butyl group, and a 2-ethylhexyl group.

Examples of the cyclic alkyl group include groups having 3 to 20 carbon atoms such as a cyclopentyl group and a cyclohexyl group.

Examples of the aryl group include groups having 6 to 20 carbon atoms such as a phenyl group and a tolyl group.

Examples of the aralkyl group include groups having 7 to 20 carbon atoms such as a benzyl group, a 2-phenylethyl group, and a 2-methyl-2-phenylethyl group.

Examples of the halogenated alkyl group include groups having 1 to 20 carbon atoms, preferably 1 to 6 carbon atoms, such as a 3,3,3-trifluoropropyl group, a 2-(nonafluorobutyl)ethyl group, and a 2-(heptadecafluorooctyl)ethyl group.

As the organic group bonded to the silicon atom, a linear alkyl group, an alkenyl group, and an aryl group are preferable, a linear alkyl group that has 1 to 6 carbon atoms, an alkenyl group, and an aryl group are more preferable, and a methyl group, a vinyl group, and a phenyl group are particularly preferable.

The molecular structure of the compound (B2) is not particularly limited, and examples thereof include linear, branched, partially branched linear, and dendritic (dendrimer-like) and preferred structure being linear and partially branched linear. The compound (B2) may be a single polymer having such a molecular structure, a copolymer having such a molecular structure, or a mixture of two or more of these polymers.

Examples of the compound (B2) include dimethylpolysiloxane capped at both molecular chain terminals with dimethylvinylsiloxy groups, dimethylpolysiloxane capped at both molecular chain terminals with methylphenylvinylsiloxy groups, dimethylsiloxane-methylphenylsiloxane copolymers capped at both molecular chain terminals with dimethylvinylsiloxy groups, dimethylsiloxane-methylvinylsiloxane copolymers capped at both molecular chain terminals with dimethylvinylsiloxy groups, dimethylsiloxane-methylvinylsiloxane copolymers capped at both molecular chain terminals with silanol groups, dimethylsiloxane-methylvinylsiloxane-methylphenylsiloxane copolymers capped at both molecular chain terminals with silanol groups, dimethylsiloxane-methylvinylsiloxane copolymers capped at both molecular chain terminals with trimethylsiloxy groups, methyl(3,3,3-trifluoropropyl)polysiloxane capped at both molecular chain terminals with dimethylvinylsiloxy groups, organosiloxane copolymers including a siloxane unit represented by Formula: $(CH_3)_3SiO_{1/2}$, a siloxane unit represented by Formula: $(CH_3)_2(CH_2{=}CH)SiO_{1/2}$, a siloxane unit represented by Formula: $CH_3SiO_{3/2}$, and a siloxane unit represented by Formula: $(CH_3)_2SiO_{2/2}$, and compounds represented by the following formula (7).

[Chemical Formula 3]

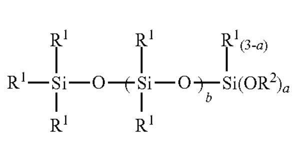

(7)

In Formula (7), $R^1$ is each independently an unsubstituted or substituted monovalent hydrocarbon group, $R^2$ is independently an alkyl group, an alkoxyalkyl group, an alkenyl group, or an acyl group, subscript b is an integer of 2 to 100, and subscript a is an integer of 1 to 3, provided that at least two of $R^1$ and $R^2$ in Formula (7) contain the ethylenically unsaturated bond.

In Formula (7), $R^1$ is each independently an unsubstituted or substituted monovalent hydrocarbon group having preferably 1 to 10 carbon atoms, and examples thereof include groups which are the same as the groups exemplified for the organic group bonded to the silicon atom. Among them, a monovalent hydrocarbon group having 1 to 6 carbon atoms is preferable, and an alkenyl group, an aryl group, and an alkyl group having 1 to 3 carbon atoms are more preferable.

Examples of the alkyl group and alkenyl group in $R^2$ in Formula (7) include a linear alkyl group, a branched alkyl group, a cyclic alkyl group, and an alkenyl group which are the same as the groups exemplified for the organic group bonded to the silicon atom.

Examples of the alkoxyalkyl group in $R^2$ in Formula (7) include groups having 2 to 10 carbon atoms such as a methoxyethyl group and a methoxypropyl group.

Examples of the acyl group in $R^2$ in Formula (7) include groups having 2 to 10 carbon atoms such as an acetyl group and an octanoyl group.

The subscript b in Formula (7) is preferably an integer of 10 to 50, and subscript a is preferably 3.

<Crosslinking Agent (C)>

The crosslinking agent (C) used herein is not particularly limited, and can be selected from conventionally known crosslinking agents depending on the kind of elastomer (A) to be used. The crosslinking agent (C) contained in the present composition may be one kind or two or more kinds.

For example, when FKM is used, examples of the crosslinking agent (C) include peroxide crosslinking agents, polyamine crosslinking agents, polyol crosslinking agents, and triazine crosslinking agents.

Among them, a peroxide crosslinking agent is preferable from the viewpoint that, for example, it is not necessary to blend an acid acceptor such as magnesium oxide or calcium hydroxide, which may become a generation source of particles, in the present composition, for example, in a plasma atmosphere, and thus there is no risk of generating particles during use of the obtained sealing material.

Examples of the peroxide crosslinking agent include 2,5-dimethyl-2,5-di(t-butylperoxy)hexane, dicumyl peroxide, 2,4-dichlorobenzoyl peroxide, di-t-butyl peroxide, t-butyldicumyl peroxide, benzoyl peroxide, 2,5-dimethyl-2,5-(t-butylperoxy)hexyne-3, 2,5-dimethyl-2,5-di(benzoylperoxy)hexane, α,α'-bis(t-butylperoxy-m-isopropyl)benzene, t-butylperoxy isopropyl carbonate, di-(4-t-butylcyclohexyl) peroxydicarbonate, p-chlorobenzoyl peroxide, t-butylperoxy-2-ethylhexanoate, t-butyl peroxybenzoate, 1,1-bis(t-butylperoxy)-3,5,5-trimethylcyclohexane, 2,5-dimethylhexane-2,5-dihydroperoxide, α,α-bis(t-butylperoxy)-p-diisopropylbenzene, t-butyl peroxybenzene, and t-butyl peroxymaleic acid.

Among them, 2,5-dimethyl-2,5-di(t-butylperoxy)hexane, 2,4-dichlorobenzoyl peroxide, dicumyl peroxide, benzoyl peroxide, and α,α'-bis(t-butylperoxy-m-isopropyl)benzene are preferable, and 2,5-dimethyl-2,5-di(t-butylperoxy) hexane is more preferable.

The content of the crosslinking agent (C) in the present composition is preferably 0.2 to 4 parts by mass, and more preferably 0.2 to 2.5 parts by mass based on 100 parts by mass of the elastomer (A) from the viewpoints that, for example, the crosslinking reaction sufficiently proceeds, and a sealing material excellent in hardness, tensile strength, and 100% Mo in a well-balanced manner can be easily obtained.

<Crosslinking Aid (D)>

The crosslinking aid (D) is not particularly limited, and a conventionally known crosslinking aid may be selected depending on the kind of crosslinking agent (C).

The crosslinking aid (D) contained in the present composition may be one kind or two or more kinds.

Examples of the crosslinking aid (D) to be used in the case of using a peroxide crosslinking agent include compounds capable of radically co-crosslinking (polyfunctional monomers) such as triallyl isocyanurate; triallyl cyanurate; trimethallyl isocyanurate; triallyl formal; triallyl trimellitate; N,N'-m-phenylenebismaleimide; dipropargyl terephthalate; diallyl phthalate; tetraallyl terephthalamide; and polyfunctional (meth)acrylates, for example, ethylene glycol di(meth)acrylate and trimethylolpropane tri(meth)acrylate: metal salts of higher carboxylic acids: polyhydric alcohol (meth) acrylates: and (meth)acrylic acid metal salts.

Among them, triallyl isocyanurate is preferable from the viewpoints of, for example, excellent reactivity, and being capable of easily obtaining a sealing material having excellent heat resistance, high hardness, and high modulus.

The content of the crosslinking aid (D) in the present composition is preferably 1 part by mass or more, more preferably 2 parts by mass or more, still more preferably 4 parts by mass or more, and preferably 10 parts by mass or less, more preferably 7 parts by mass or less, still more preferably 6 parts by mass or less based on 100 parts by mass of the elastomer (A) from the viewpoints that, for example, the crosslinking reaction sufficiently proceeds, and a sealing material excellent in hardness, tensile strength, and 100% Mo in a well-balanced manner can be easily obtained.

In particular, in order to suppress cracks that may be generated in the sealing material, for example, in a plasma atmosphere, a radiation-crosslinked sealing material (radiation-treated product) is preferable. In this case, the content of the crosslinking aid (D) in the present composition is preferably 2 parts by mass or more, more preferably 4 parts by mass or more, and preferably 7 parts by mass or less, more preferably 6 parts by mass or less based on 100 parts by mass of the elastomer (A) from the viewpoint that, for example, a sealing material having higher hardness and higher modulus can be easily obtained without using a filler as described below.

The mass ratio of the content of the crosslinking aid (D) to the content of the crosslinking agent (C) in the present composition (the content of the crosslinking aid (D)/the content of the crosslinking agent (C)) is 5 or more, preferably 8 or more, more preferably more than 8, still more preferably 9 or more, particularly preferably 10 or more, and preferably 30 or less, more preferably 20 or less from the viewpoints of, for example, allowing the crosslinking agent (C) to react without excess or deficiency and being capable of easily obtaining a sealing material exhibiting desired physical properties, particularly from the viewpoint of, for example, being capable of easily obtaining a sealing material having higher hardness and higher modulus without using a filler as described below.

<Other Components>

In addition to the above (A) to (D), the present composition may contain, as necessary, conventionally known other components that have been blended in the sealing material as long as the effects of the present invention are not impaired. Examples of the other component include reactive organosilicon compounds having two or more hydrosilyl groups in the molecule; catalysts; acid acceptors such as magnesium oxide and calcium hydroxide; organic pigments such as anthraquinone pigments, perylene pigments, and dioxazine pigments; plasticizers; processing aids; vulcanization accelerators; antiaging agents; antioxidants; inorganic fillers; and organic fillers.

Each of the other components used may be one kind only or two or more kinds.

Suitable examples of the reactive organosilicon compound include compounds which are the same as the organosilicon compounds described in, for example, JP 2003-183402 A and JP H11-116684 A.

Suitable examples of the catalyst include catalysts which are the same as the catalysts described in, for example, JP 2003-183402 A and JP H11-116684 A.

Suitable examples of the organic pigment include organic pigments which are the same as the organic pigments described in, for example, WO 2016/043100 A, JP 4720501 B2, and WO 2004/094527 A.

The inorganic filler and the organic filler (hereinafter, these are also collectively and simply referred to as a "filler") are particulate (powdery) components other than the compound (B), the crosslinking agent (C), and the crosslinking aid (D).

Examples of the inorganic filler include carbon black, silica, barium sulfate, titanium oxide, and aluminum oxide.

Examples of the organic filler include fluororesins such as PTFE, PFA, FEP, ETFE, and PVDF, polyethylene resins, polyimide resins, silicone resins, and melamine resins.

When the present composition is used for production of such a sealing material in which generation of particles, for example, in a plasma atmosphere is a problem, the content of the filler is preferably 5 parts by mass or less, more preferably 3 parts by mass or less, and most preferably 0 parts by mass based on 100 parts by mass of the elastomer (A).

<Method for Producing Present Composition>

The present composition can be produced by mixing (kneading) the elastomer (A), the compound (B), the crosslinking agent (C), the crosslinking aid (D), and the other components as necessary.

The order of mixing the elastomer (A), the compound (B), the crosslinking agent (C), the crosslinking aid (D), and the other components is not particularly limited. They may be sequentially mixed (kneaded) in any order, or may be mixed (kneaded) all at once, but it is preferable that they are sequentially mixed (kneaded) such that the respective components are uniform.

At the time of the mixing (kneading), a conventionally known mixing (kneading) machine can be used, and examples thereof include an open roll, a Banbury mixer, a biaxial roll, and a kneader.

At the time of the mixing (kneading), mixing (kneading) may be performed under heating or cooling as necessary depending on a mixing (kneading) machine.

<<Sealing Material>>

The sealing material according to one embodiment of the present invention (hereinafter, also referred to as the "present sealing material") is a sealing material obtained from the present composition, is preferably a crosslinked body of the present composition, and is more preferably a radiation-crosslinked body of the present composition.

The radiation-crosslinked body of the present composition is specifically a radiation-crosslinked body obtained by a method including a step of irradiating the present composition itself or a crosslinked product of the present composition (for example, a crosslinked product obtained by thermally crosslinking the present composition) with radiation.

Since the present sealing material is obtained from the present composition, it is excellent in hardness, tensile strength, and 100% Mo in a well-balanced manner, and further excellent in, for example, plasma resistance (radical resistance), crack resistance, and compression set.

The present sealing material can be used as, for example, a gasket or packing of various members, and can be suitably used particularly for a semiconductor manufacturing apparatus, or a plasma processing apparatus, and particularly for a drive unit including a gate valve used for an opening of a plasma processing chamber unit due to the sealing material exhibiting the above effects.

The present sealing material has, for example, a shape that may be appropriately selected depending on the intended use.

The present sealing material can be a sealing material that has the following physical properties despite not containing the filler.

The 100% Mo of the present sealing material measured according to JIS K 6251: 2017 is preferably 2.4 MPa or more, more preferably 3 MPa or more, still more preferably 4.5 MPa or more, and particularly preferably 5 MPa or more.

The Shore A hardness (Type A durometer hardness) of the present sealing material measured according to JIS K 6253: 2012 is preferably 60 or more.

The tensile strength of the present sealing material measured according to JIS K 6251: 2017 is preferably 10 MPa or more.

<Method for Producing Present Sealing Material>

Specifically, the present sealing material can be produced by molding the present composition, but is preferably a crosslinked product obtained by a method including a step of subjecting the present composition to a crosslinking treatment (crosslinking step) from the viewpoint that, for example, a sealing material having more excellent, for example, plasma resistance (radical resistance), crack resistance, and non-adhesiveness can be easily obtained, and is more preferably a radiation-treated product obtained by a method including a step of irradiating the present composition with radiation (step of irradiating with radiation) from the viewpoint that, for example, a sealing material excellent in hardness, tensile strength, elongation at break, and 100% Mo in a well-balanced manner can be easily obtained.

At the time of forming a sealing material from the present composition, it is preferable to perform the sheeting step from the viewpoints of, for example, improving the efficiency of the molding operation and reducing the defect rate. This sheeting step is usually performed using, for example, a roll, and is usually also a step of preliminarily forming the present composition into a sheet.

The sheet obtained in the sheeting step is preferably preformed into a desired sealing material shape before the crosslinking step or the step of irradiating with radiation.

In this preforming, a desired sealing material shape may be directly formed from the sheet obtained in the sheeting step, or the sheet obtained in the sheeting step may be formed into, for example, a rope shape (having the same meaning as, for example, a ribbon shape or a noodle shape) by, for example, cutting or extrusion molding, and then the obtained rope-shaped product may be formed into a desired sealing material shape.

At the time of producing the present sealing material, it is preferable to include a crosslinking step before the step of irradiating with radiation, and the crosslinking step more preferably includes a primary crosslinking step and a secondary crosslinking step.

The crosslinking step is preferably performed using a desired sealing material-shaped object that is obtained in the preforming.

The primary crosslinking step is preferably a step of heating and pressurizing a desired sealing material-shaped object that is obtained in the preforming, and as a specific example, there may be mentioned a step of crosslinking the preformed material which is cast into a mold, at a temperature of, for example, 150 to 200° C. for, for example, about 5 to 20 minutes under a pressure of about 2 to 15 MPa by, for example, a heating press machine.

The secondary crosslinking step is preferably a step of heating the molded body obtained in the primary crosslinking step, and as a specific example, there may be mentioned a step of heating the molded body at a temperature of, for example, 150 to 300° C. for about 1 to 24 hours, more preferably about 3 to 24 hours using various ovens, preferably a vacuum oven, under from normal pressure to reduced pressure.

By this secondary crosslinking step, crosslinking can be promoted, or even if an unreacted component remains after the primary crosslinking step, the unreacted component can be decomposed and volatilized, and a sealing material with less generation of release gas can be obtained.

The radiation used for irradiation in the step of irradiating with radiation is not particularly limited as long as it can crosslink the elastomer (A). Examples thereof include an X-ray, a gamma ray, an electron beam, a proton beam, a neutron beam, a heavy particle beam, an alpha beam, and a beta beam, and among these, a gamma ray and an electron beam are preferable.

The radiation used for irradiation may be one kind or two or more kinds.

At the time of irradiating with radiation, it is desirable to irradiate with radiation such that the absorbed dose is preferably 1 to 120 kGy, and more preferably 20 to 100 kGy. When radiation is applied in such an amount, it is possible to reduce unreacted components that may be particles or release gas, and a sealing material excellent in, for example, plasma resistance and crack resistance can be easily obtained without excessively reducing the molecular weight of the elastomer (A).

The step of irradiating with radiation may be performed in two or more stages with conditions changed.

At the time of irradiating with radiation, irradiation may be performed in the air. However, when oxygen is present at the time of irradiating with radiation, the crosslinking reaction may be inhibited, and there is a possibility that the mechanical strength of the sealing material is reduced or stickiness appears on the surface of the sealing material. Thus, the step of irradiating with radiation is preferably performed in an atmosphere of an inert gas such as nitrogen or argon.

EXAMPLES

Next, the present invention will be described in more detail with reference to examples, but the present invention is not limited thereto.

Example 1

Into a kneader, 70 parts by mass of Tecnoflon P959 (manufactured by Solvay), 30 parts by mass of Tecnoflon P757 (manufactured by Solvay), 1.0 parts by mass of SIFEL 8070A (manufactured by Shin-Etsu Chemical Co., Ltd.), 1.0 parts by mass of SIFEL 8070B (manufactured by Shin-Etsu Chemical Co., Ltd.), 4.0 parts by mass of TAIC (triallyl isocyanurate, manufactured by Mitsubishi Chemical Corporation), and 0.5 parts by mass of PERHEXA 25B (manufactured by NOF CORPORATION) were sequentially fed and the contents were kneaded until the current value was stabilized to obtain a bulk elastomer composition.

At least one of SIFEL 8070A and SIFEL 8070B contains a compound having a perfluoro skeleton having an ethylenically unsaturated bond.

The obtained bulk elastomer composition was filled in a mold, and press-molded at 170° C. for 10 minutes under a pressure of 5 MPa using a compression vacuum press machine (primary crosslinking), and then the sheet after the press-molding was heated at 200° C. for 16 hours under reduced pressure in a vacuum oven (degree of vacuum: 50 Pa) (secondary crosslinking). Thereafter, the secondary-crosslinked sheet was irradiated with radiation such that the absorbed dose was 80 kGy, thereby producing a radiation-crosslinked body.

The produced radiation-crosslinked body was measured for the following normal physical properties and plasma resistance. The results are shown in Table 1.

Examples 2 to 10 and Comparative Examples 1 and 2

The following normal physical properties and plasma resistance were measured in the same manner as in Example 1 except that each component shown in Table 1 was used in the amount shown in Table 1 instead of the components used in Example 1. The results are shown in Table 1.

<Normal Physical Properties>

As normal physical properties, the Shore A hardness was measured in accordance with JIS K 6253: 2012, and the tensile strength and the tensile stress at 100% elongation (100% Mo) were measured in accordance with JIS K 6251: 2017.

<Plasma Resistance>

The obtained molded body was measured for the plasma resistance (mass reduction ratio). Specifically, measurement was performed as follows.

Using a flat plate plasma processing apparatus having an electrode diameter of φ300 mm and an inter-electrode distance of 50 mm, the obtained molded body was irradiated with plasma for 3 hours under the conditions of an RF 1000 W, a flow rate ratio of $O_2$ gas to $CF_4$ gas ($O_2$:$CF_4$) of 190:10, a gas flow rate of 200 sccm, and a degree of vacuum of 1 torr.

The obtained molded body was placed at a position 6 cm away from the plasma electrode. Next, the mass of the molded body before and after the test was measured, and the mass reduction ratio (%) was determined by the following formula to evaluate the plasma resistance. It can be said that the smaller the mass reduction ratio is, the better the plasma resistance is.

$$\text{Mass reduction ratio (\%)}=[(\text{mass of molded body before test}-\text{mass of molded body after test})/\text{mass of molded body before test}]\times 100$$

TABLE 1

| | | Example | | | | | |
|---|---|---|---|---|---|---|---|
| | | 1 | 2 | 3 | 4 | 5 | 6 |
| Tecnoflon P959 | | 70 | 70 | 70 | 70 | 100 | |
| Tecnoflon P757 | | 30 | 30 | 30 | | | 30 |
| Tecnoflon P459 | | | | | 30 | | |
| DAI-EL G912 | | | | | | | 70 |
| SIFEL 8070A | | 1.0 | 1.0 | 1.0 | 1.0 | 1.0 | |
| SIFEL 8070B | | 1.0 | 1.0 | 1.0 | 1.0 | 1.0 | |
| SIFEL 3590-N | | | | | | | 2.0 |
| X-71-906 | | | | | | | |
| KE-1830 | | | | | | | |
| TAIC | | 4.0 | 5.0 | 6.0 | 6.0 | 6.0 | 6 |
| PERHEXA 25B | | 0.5 | 0.5 | 0.5 | 0.5 | 0.5 | 1 |
| Normal physical properties | Hardness (shore A) | 60 | 62 | 66 | 67 | 68 | 69 |
| | Tensile strength (MPa) | 10.1 | 10.7 | 15.6 | 15.5 | 12.9 | 10.1 |
| | 100% Mo(MPa) | 2.43 | 3.02 | 4.5 | 6.0 | 5.5 | 6.3 |
| Plasma resistance | Mass reduction ratio (%) | 1.07 | 1.07 | 1.08 | 1.05 | 1.04 | |

| | | Example | | | | Comparative Example | |
|---|---|---|---|---|---|---|---|
| | | 7 | 8 | 9 | 10 | 1 | 2 |
| Tecnoflon P959 | | | | | | 70 | |
| Tecnoflon P757 | | 30 | 30 | 30 | 30 | 30 | 30 |
| Tecnoflon P459 | | | | | | | |
| DAI-EL G912 | | 70 | 70 | 70 | 70 | | 70 |
| SIFEL 8070A | | | | | | 1.0 | |
| SIFEL 8070B | | | | | | 1.0 | |
| SIFEL 3590-N | | 10.0 | 20.0 | | | | |
| X-71-906 | | | | 2.0 | | | |
| KE-1830 | | | | | 2.0 | | |
| TAIC | | 6 | 6 | 6 | 6 | 2.0 | 6 |
| PERHEXA 25B | | 1 | 1 | 1 | 0.5 | 0.5 | 0.5 |
| Normal physical properties | Hardness (shore A) | 68 | 71 | 70 | 70 | 61 | 69 |
| | Tensile strength (MPa) | 11.2 | 12.4 | 10.1 | 10.2 | 11.2 | 6.3 |
| | 100% Mo(MPa) | 5.5 | 5.9 | 6.0 | 6.1 | 1.4 | — |
| Plasma resistance | Mass reduction ratio (%) | | | | | 1.07 | |

Raw materials in Table 1 that are not used in Example 1 are as follows.

Tecnoflon P459: crosslinkable fluoroelastomer (manufactured by Solvay)

DAI-EL G912: crosslinkable fluoroelastomer (manufactured by DAIKIN INDUSTRIES, LTD.)

SIFEL 3590-N (containing a compound having a perfluoro skeleton having an ethylenically unsaturated bond, one-component liquid type, manufactured by Shin-Etsu Chemical Co., Ltd.)

X-71-906 (containing a compound having a perfluoro skeleton having an ethylenically unsaturated bond, millable type, manufactured by Shin-Etsu Chemical Co., Ltd.)

KE-1830 (containing a compound having a siloxane skeleton having an ethylenically unsaturated bond, one-component liquid type, manufactured by Shin-Etsu Chemical Co., Ltd.)

The invention claimed is:

1. An elastomer composition comprising:

a crosslinkable fluoroelastomer (A) other than a perfluoroelastomer, an ethylenically unsaturated bond-containing compound (B), a crosslinking agent (C), and a crosslinking aid (D), wherein the ethylenically unsaturated bond-containing compound (B) comprises at least one selected from compounds having a perfluoro skeleton having an ethylenically unsaturated bond and compounds having a siloxane skeleton having an ethylenically unsaturated bond, and a mass ratio of a content of the crosslinking aid (D) to the crosslinking agent (C) is 5 or more.

2. The elastomer composition according to claim 1, wherein the elastomer (A) is a peroxide-crosslinkable fluoroelastomer.

3. The elastomer composition according to claim 1, wherein a content of the ethylenically unsaturated bond-containing compound (B) is 0.5 to 50 parts by mass based on 100 parts by mass of a content of the elastomer (A).

4. The elastomer composition according to claim 1, wherein a content of the crosslinking aid (D) is 1 to 10 parts by mass based on 100 parts by mass of a content of the elastomer (A).

5. The elastomer composition according to claim 1, wherein a content of a filler is 5 parts by mass or less based on 100 parts by mass of the elastomer (A).

6. A sealing material that is a radiation-crosslinked body of the elastomer composition according to claim 1.

7. A method for producing a sealing material, comprising a step of irradiating the elastomer composition according to claim 1 or a crosslinked product of the elastomer composition with radiation.

* * * * *